United States Patent
Lee

(10) Patent No.: US 11,118,037 B2
(45) Date of Patent: Sep. 14, 2021

(54) RUBBER COMPOSITION FOR SHOE SOLE AND MOLDED ARTICLE COMPRISING THE SAME

(71) Applicant: Fine Chemical Co., Ltd., Gimhae-si (KR)

(72) Inventor: Sung Yull Lee, Busan (KR)

(73) Assignee: FINE CHEMICAL CO., LTD., Gimhae-si (KR)

( * ) Notice: Subject to any disclaimer, the term of this patent is extended or adjusted under 35 U.S.C. 154(b) by 23 days.

(21) Appl. No.: 16/550,756

(22) Filed: Aug. 26, 2019

(65) Prior Publication Data

US 2019/0375921 A1   Dec. 12, 2019

Related U.S. Application Data

(63) Continuation of application No. PCT/KR2018/002815, filed on Mar. 9, 2018.

(30) Foreign Application Priority Data

Mar. 31, 2017  (KR) ......................... 10-2017-0041486

(51) Int. Cl.
  *C08L 9/06* (2006.01)
  *A43B 13/04* (2006.01)
  *C08L 53/02* (2006.01)

(52) U.S. Cl.
  CPC ................ *C08L 9/06* (2013.01); *A43B 13/04* (2013.01); *C08L 53/02* (2013.01); *C08L 2312/00* (2013.01)

(58) Field of Classification Search
  CPC .... C08L 53/02; C08L 9/00; C08L 9/06; C08L 25/10; C08L 2312/00; C08F 2/04; A43B 13/04
  USPC ........................................................ 524/505
  See application file for complete search history.

(56) References Cited

U.S. PATENT DOCUMENTS

| | | | |
|---|---|---|---|
| 2010/0003527 A1* | 1/2010 | Gustafsson | C08L 53/02 428/424.8 |
| 2016/0009907 A1 | 1/2016 | Naito et al. | |
| 2016/0289429 A1 | 10/2016 | Van Der Waal | |

FOREIGN PATENT DOCUMENTS

| JP | 2000189207 A | 7/2000 |
|---|---|---|
| KR | 1020040050165 A | 6/2004 |
| KR | 1020050112431 A | 11/2005 |
| KR | 1020060042463 A | 5/2006 |
| KR | 1020060092457 A | 8/2006 |

OTHER PUBLICATIONS

International Search Report of PCT/KR2018/002815, dated Jun. 1, 2018, English translation.
Asahi Kasei, Asadene, Tufdene, Asaprene, Retrieved from the internet<URL:https://www.akelastomer.com/eng/brochures/brsbr_eng.pdf>, Apr. 1, 2016, pp. 1-4, Asai Kasei Corporation, Tokyo, Japan.
Korea Kumho Petrochemical Co., Ltd., Kumho KTR SBS (Styrene-Butadiene-Styrene) Block Copolymer, Retrieved from the Internet: <URL:http://www.kkpc.co.kr/kor/product/syntheticRubber/productDetail/?seq=9>, Apr. 3, 2015, Korea Kumho Petrochemcial Co., Ltd., Seoul, Republic of Korea.

* cited by examiner

*Primary Examiner* — William K Cheung
(74) *Attorney, Agent, or Firm* — STIP Law Group, LLC

(57) ABSTRACT

Provided is a rubber composition for a shoe sole. The rubber composition includes: an elastic polymer including a styrene butadiene rubber (SBR) and a styrene butadiene styrene (SBS) thermoplastic rubber; and a crosslinking agent. The total styrene content of the elastic polymer is at least 35% by weight.

14 Claims, No Drawings

RUBBER COMPOSITION FOR SHOE SOLE AND MOLDED ARTICLE COMPRISING THE SAME

CROSS-REFERENCE TO RELATED APPLICATIONS

This application is a continuation of Application No. PCT/KR2018/002815, filed Mar. 9, 2018 which in turn claims the benefit of Korean Patent Application No. 10-2017-0041486, filed Mar. 31, 2017, the disclosures of which are incorporated by reference into the present application.

TECHNICAL FIELD

The present invention relates to a rubber composition for a shoe sole and a molded article including the same. More specifically, the present invention relates to a rubber composition for a shoe sole that has superior yellowing stability at high temperatures as well as at room temperature and is excellent in transparency and wear resistance while maintaining its tensile strength and hardness, and a molded article including the rubber composition.

BACKGROUND ART

Rubbers are used in various applications in our daily life and most of them are utilized particularly in opaque articles. Recently, shoes using shoe soles made of transparent rubbers have been popularized. In such a shoes product, various designs are printed on a shoe insole and a transparent rubber is used for a shoe outsole, which make the shoes product attractive in color and see-through. However, conventional transparent rubbers have unsatisfactory transparency, are very expensive, and tend to become yellow by hydrolysis during storage. Conventional transparent rubbers still need to be improved.

Transparent shoe soles are usually produced by compression molding of compositions including a polymer blend of an isoprene rubber (IR), a high-cis butadiene rubber (BR), and a solution polymerized styrene butadiene rubber (SBR) and one or more additives such as fumed silica, organic peroxides, and antioxidants. Conventional transparent shoe soles have high transparency and good physical properties and are inexpensive but tend to become yellow, even brown, during shoemaking, during distribution before sale to consumers or during storage on the shoe shelf at room temperature in the dark protected from light after users take off their shoes. This phenomenon is further accelerated in places under high humidity and high temperature conditions.

U.S. Patent Publication No. 20160009907 filed by Kraton discloses a transparent, crosslinked rubber composition using low-cis isoprene rubber (Cariflex IR0307KU) having 90-94% of cis content. However, there is no significant difference in physical properties between the crosslinked rubber composition and rubber compositions (cis content-98%) of other companies. Further, the crosslinked rubber composition is not suitable for use in shoe soles due to its poor wear resistance.

The same applicant attempted to increase the wear resistance of an isoprene rubber composition by the addition of a polycyclooctene commercially available as Vestenamer® (U.S. Patent Publication No. 20160289429). However, this composition is difficult to apply to shoe soles due to its poor transparency and high price.

Therefore, there is a need to develop a suitable composition with improved transparency and wear resistance suitable for use in the production of a shoe sole.

DETAILED DESCRIPTION OF THE INVENTION

Problems to be Solved by the Invention

The present invention has been made in an effort to solve the problems of the prior art and it is one object of the present invention to provide a rubber composition for a shoe sole that has superior yellowing stability at high temperatures as well as at room temperature and is excellent in transparency and wear resistance while maintaining its tensile strength and hardness.

It is another object of the present invention to provide a molded article including the rubber composition.

Means for Solving the Problems

One aspect of the present invention provides a rubber composition for a shoe sole including: an elastic polymer including a solution polymerized styrene butadiene rubber (SBR) and a styrene butadiene styrene (SBS) thermoplastic rubber; and a crosslinking agent, wherein the total styrene content of the elastic polymer is at least 35% by weight.

The present invention also provides a molded article including the rubber composition.

Effects of the Invention

The rubber composition for a shoe sole of the present invention has superior yellowing stability at high temperatures as well as at room temperature and is excellent in transparency and wear resistance while maintaining its tensile strength and hardness. Due to these advantages, the rubber composition of the present invention is suitable for use in the production of a molded article, particularly a shoe sole.

MODE FOR CARRYING OUT THE INVENTION

Exemplary embodiments of the present invention will now be described in more detail.

The present inventors have found that a transparent rubber composition for a shoe sole including a controlled amount of a crosslinking agent, a controlled amount of a silane coupling agent and a controlled amount of a styrene has improved transparency and wear resistance without deterioration of its physical properties. The present invention has been accomplished based on this finding.

Details of a rubber composition for a shoe sole according to the present invention are as follows.

The rubber composition of the present invention includes: an elastic polymer including a solution polymerized styrene butadiene rubber (SBR) and a styrene butadiene styrene (SBS) thermoplastic rubber; and a crosslinking agent, wherein the total styrene content of the elastic polymer is at least 35% by weight.

For example, the solution polymerized styrene butadiene rubber (SBR) may be prepared by solution polymerization of butadiene and styrene.

The styrene butadiene rubber (SBR) has better wear resistance and heat resistance and is easier to process than natural rubbers. The styrene butadiene rubber can be prepared by emulsion polymerization or solution polymerization of butadiene and styrene as raw materials. The styrene butadiene rubber is referred to as "emulsion SBR (E-SBR)" when prepared by emulsion polymerization or as "solution SBR (S-SBR)" when prepared by solution polymerization. The balance between the contents of 1,4-butadiene and 1,2-butadiene as the structural units along the polymer chain may have the greatest influence on the glass transition temperature ($T_g$) of the polymer.

Preferably, the styrene butadiene rubber (SBR) is prepared by solution polymerization. According to the solution polymerization, styrene is allowed to react with butadiene in an organic solvent in the presence of an alkyl lithium catalyst to prepare the SBR. The SBR prepared by solution polymerization is excellent in processability, viscoelasticity, and low-temperature characteristics compared to that prepared by emulsion polymerization. In addition, the SBR prepared by solution polymerization has a good balance of styrene content, microstructure, and molecular weight. Thus, solution polymerization offers a wide range of choice of suitable products for the intended applications.

The solution polymerized SBR has a narrower molecular weight distribution than the emulsion polymerized SBR because leaving groups whose reactivity remains even after polymerization are present at the ends of the chain. The solution polymerized SBR is prepared in higher purity than the emulsion polymerized SBR because no emulsifying agent is left. For this reason, the styrene butadiene rubber prepared by solution polymerization without leaving an emulsifying agent is preferred for a transparent shoe sole than the styrene butadiene rubber prepared by emulsion polymerization.

For example, the styrene butadiene rubber (SBR) may be prepared by solution polymerization of 20 to 75% by weight of butadiene and 25 to 80% by weight of styrene.

The butadiene is a polymer or copolymer prepared by polymerization of a conjugated diene-based compound having a structure in which double bonds and single bonds are arranged alternately. For example, the butadiene may be selected from the group consisting of butadiene polymers, butadiene-styrene copolymers, and butadiene-acrylonitrile copolymers.

For example, the butadiene may be present in an amount ranging from 20 to 75% by weight or 20 to 50% by weight, based on the weight of the solution polymerized styrene butadiene rubber (SBR). This range ensures excellent processability, transparency, and wear resistance.

For example, the styrene may be present in an amount of at least 25% by weight, for example 25 to 80% by weight or 50 to 80% by weight, based on the weight of the solution polymerized styrene butadiene rubber (SBR). This range ensures well-balanced physical properties (including elasticity). For reference, it is noted that an increase in the styrene content leads to a reduction in rebound resilience and an increase in the glass transition temperature and hardness of the rubber after vulcanization.

The styrene butadiene rubber may be a random or block copolymer. The random copolymer rubber is prepared by thoroughly mixing and reacting styrene with butadiene. In the block copolymer rubber, styrene and butadiene blocks are arranged in blocks rather than randomly. Specifically, the block polymer rubber has a structure in which butadiene blocks are arranged between both terminal styrene blocks. The greatest advantage of the S-SBR over the E-SBR is that the vinyl structure content and the styrene content specifying the physical properties of the rubber can be arbitrarily controlled and the molecular weight and the physical properties of the S-SBR can be balanced by appropriate processing such as coupling or modification. The solution polymerized random SBR exhibits intermediate characteristics between the emulsion polymerized SBR and a low cis-butadiene rubber. In addition, the solution polymerized random SBR has a narrower molecular weight distribution and a more linear molecular chain than the emulsion polymerized SBR. Furthermore, the solution polymerized random SBR is excellent in wear resistance, electrical properties, and low exothermicity during a dynamic change. The solution polymerized SBR in the form of a block copolymer has good extrusion processability, undergoes less shrinkage, and is excellent in electrical properties. Due to these advantages, the solution polymerized SBR in the form of a block copolymer is widely used for the production of hard rubber products.

The styrene butadiene rubber is preferably the solution polymerized SBR in the form of a block copolymer. The use of the solution polymerized SBR in the form of a random copolymer may deteriorate the transparency of the composition.

The styrene butadiene rubber is preferably a non-oil extended styrene butadiene rubber. If the styrene butadiene rubber is an oil extended SBR, the difference in refractive index between the extender oil and the rubber may deteriorate the transparency of the composition.

The styrene butadiene styrene (SBS) thermoplastic rubber is generally a block copolymer having a structure in which two polystyrene blocks are separated by a saturated polybutadiene block including less than 20% residual ethylenic unsaturation. The preferred styrene butadiene styrene block copolymer has a linear structure although branched or radial polymers or functionalized block copolymers make useful compounds.

Typically, the styrene butadiene styrene block copolymer includes polystyrene endblocks having a number average molecular weight of 5,000 to 35,000 and a saturated polybutadiene midblock having a number average molecular weight of 20,000 to 170,000. Preferably, the saturated polybutadiene block has from 35% to 55% 1,2-configuration.

The total number average molecular weight of the styrene butadiene styrene block copolymer is preferably from 30,000 to 250,000 when the copolymer has a linear structure. The styrene butadiene styrene thermoplastic rubber has a styrene content of at least 25% by weight, preferably at least 30% by weight, typically 50% by weight or less. Within this styrene content range, the styrene butadiene styrene block copolymer has well-balanced physical properties, including hardness and elasticity.

The SBS block copolymer can be prepared by any suitable method known in the art. For example, the SBS block copolymer may be prepared using a free-radical, cationic or anionic initiator or a polymerization catalyst. The polymer may be prepared using a bulk, solution or emulsion technique. In any case, the styrene block copolymer containing at least ethylenic unsaturation will, generally, be recovered as a solid such as a crumb, a powder, a pellet, or the like.

In general, when an anionic polymerization technique is used, a conjugated diolefin polymer and a copolymer of a conjugated diolefin and an alkenyl aromatic hydrocarbon are prepared by contacting the monomer or monomers to be polymerized simultaneously or sequentially with an organo-alkali metal compound in a suitable solvent at a temperature in the range of −150 to 300° C., preferably at a temperature in the range of 0 to 100° C. A particularly effective anionic polymerization initiator is an organolithium compound having the general formula $RLi_n$ (wherein R is an aliphatic, cycloaliphatic, aromatic or alkyl-substituted aromatic hydrocarbon group having 1 to 20 carbon atoms and n is an integer from 1 to 4).

Like the styrene butadiene rubber, the SBS thermoplastic rubber is preferably a non-oil extended SBS thermoplastic rubber whose transparency is prevented from deteriorating.

In one embodiment, the elastic polymer may have a total styrene content of at least 35% by weight, for example 35 to 55% by weight, preferably 38 to 53% by weight, more preferably 40 to 50% by weight. If the styrene content is less than the lower limit defined above, the hardness of the rubber composition is lowered, making it impossible to use the rubber composition for the production of a shoe sole. Meanwhile, if the styrene content is higher than the upper limit defined above, the rubber composition may be excessively hard and slippery, making it difficult to use the rubber composition for the production of a sports shoe.

The styrene butadiene rubber has a Mooney viscosity ($ML_{1+4}$, 100° C.) in the range of 35 to 75, preferably 40 to 60. This range is preferred from the viewpoint of computability between processability and mechanical strength. The styrene butadiene rubber has a glass transition temperature ($T_g$) in the range of −95 to 0° C., preferably −90 to −5° C. Within this range, the viscosity of the composition can be prevented from increasing, facilitating the handling of the composition. The styrene butadiene styrene thermoplastic rubber has a melt index (MI, 190° C., 5 kg) not higher than 80 g/10 min, preferably not higher than 60 g/10 min, more preferably not higher than 40 g/10 min. The lower limit of the melt index of the styrene butadiene styrene thermoplastic rubber may be at least 0.1 g/10 min. If the melt index of the styrene butadiene styrene thermoplastic rubber is higher than the upper limit defined above, the viscosity of the composition is so low that the composition may be filled with voids during press molding or various strength characteristics (including tensile strength) of the composition may be lowered. Meanwhile, if the melt index of the styrene butadiene styrene thermoplastic rubber is less than the lower limit defined above, the flowability of the composition may deteriorate, resulting in poor processability, for example, during injection molding, and low productivity.

The solution polymerized styrene butadiene rubber (SBR) may be present in an amount of 30 to 70% by weight and the styrene butadiene styrene (SBS) thermoplastic rubber may be present in an amount of 70 to 30% by weight, based on 100% by weight of the elastic polymer. The relative ratio of the composition content is not particularly limited if the total styrene content of the composition is 35% by weight or more.

As the amount of SBR increases, the hardness and the mechanical strength of the foam become lower, and when the amount of SBS increases, the hardness of the foam increases. Therefore, the relative ratio of the components can be appropriately selected so that hardness and physical properties of the final product fall within a desired range.

In a preferred embodiment, the rubber composition of the present disclosure may further include a silane coupling agent for high transparency. When the silane coupling agents are added to the rubber composition for a shoe sole, the tensile strength and the wear resistance can be improved.

Suitable silane coupling agents may be, for example, alkoxysilanes. Examples of the alkoxysilanes include vinyltrimethoxysilane, vinyltriethoxysilane, tetraethoxysilane, tetra-n-propoxysilane, methyltriethoxysilane, methyltrimethoxysilane, methyltri(2-methoxyethoxy) silane, 3-methacryloyloxypropyl-trimethoxysilane, 3-mercaptopropyl-trimethoxysilane, 3-aminopropyl-trimethoxysilane, and 3-glycidyloxypropyl-trimethoxysilane. These silane coupling agents may be used alone or in combination of two or more thereof.

In one embodiment of the present invention, the silane coupling agent may be used in an amount of 0.01 to 2 parts by weight, preferably 0.1 to 1.5 parts by weight, based on 100 parts by weight of the elastic polymer. The use of the silane coupling agent in an amount less than the lower limit defined above does not contribute to an improvement in tensile strength or wear resistance. Meanwhile, the use of the silane coupling agent in an amount exceeding the upper limit defined above results in little improvement in physical properties and leads to a rise in cost.

In a preferred embodiment, the rubber composition of the present disclosure may further include silica for high transparency. The silica may be used in an amount of 5.0 parts by weight or less, preferably 4.0 parts by weight or less, based on 100 parts by weight of the elastic polymer. For example, the silica may be used in an amount of 0.1 to 5.0 parts by weight, based on 100 parts by weight of the elastic polymer.

The addition of the silica leads to improved wear resistance and mold releasability of the rubber composition. In addition, the silica improves the tackiness between the rubber raw materials to facilitate handling of the composition, resulting in high productivity. If the amount of the silica exceeds the upper limit defined above, the composition may tend to become yellow by heat generated during processing and may lose its transparency.

In one embodiment of the present invention, the crosslinking agent may serve to form a network structure through intermolecular crosslinking. The crosslinking agent is preferably an organic peroxide crosslinking agent that is easy to handle, inexpensive, and readily commercially available. Examples of such organic peroxides include t-butylperoxy-isopropylcarbonate, t-butyl peroxylaurylate, t-butyl peroxyacetate, di-t-butyl peroxyphthalate, t-dibutyl peroxy maleic acid, cyclohexanone peroxide, t-butylcumyl peroxide, t-butyl hydroperoxide, t-butyl peroxybenzoate, dicumyl peroxide, 1,3-bis(t-butylperoxyisopropyl)benzene, methyl ethyl ketone peroxide, 2,5-dimethyl-2,5-di(benzoyloxy)hexane, 2,5-dimethyl-2,5-di(t-butylperoxy)hexane, di-t-butyl peroxide, 2,5-dimethyl-2,5-(t-butylperoxy)-3-hexane, n-butyl-4,4-bis(t-butylperoxy)valerate, and α,α'-bis(t-butylperoxy)diisopropylbenzene, which are widely used in rubber compounding. The crosslinking agent may be used in an amount of 0.01 to 3 parts by weight, preferably 0.1 to 2 parts by weight, based on 100 parts by weight of the elastic polymer. If the amount of the crosslinking agent is less than the lower limit defined above, sufficient crosslinking may not occur, resulting in loss of function of a final shoe sole. Meanwhile, if the amount of the crosslinking agent exceeds the upper limit defined above, excessive crosslinking may occur, resulting in loss of flexibility of a final shoe sole.

The rubber composition may be used to produce a shoe sole, for example, a transparent shoe sole.

The rubber composition may use one or more general additives as long as the additives do not negatively affect the physical properties of the rubber composition.

The present invention also provides a molded article including the rubber composition.

The molded article may be, for example, a compression or injection molded article. Specifically, the molded article may be a shoe sole, a toy or a sports pad (knee pad, elbow pad, neck pad, or the like).

In one embodiment of the present invention, the shoe sole produced using the rubber composition is highly transparent, undergoes less yellowing, and has appropriate hardness and elasticity, and superior wear resistance.

The transparency of the shoe sole can be determined by a haze or total transmittance (TT) value measured in accordance with ASTM D1003. According to one embodiment of the present invention, a haze of 10% or less and a total transmittance of 90% or more are suitable criteria for transparency of the shoe sole.

According to one embodiment of the present invention, the wear resistance (DIN abrasion value) of the shoe sole may be controlled to 150 mm$^3$ or less under the testing method of DIN 53516, which ensures suitable mechanical properties of the shoe sole.

The present invention will be explained in more detail with reference to the following examples. However, these examples are not intended to limit the spirit of the present invention.

EXAMPLES

In the following examples, including comparative examples, transparent shoe soles were produced using the following compounds:

SSBR-1: S-1433, Dynasol, styrene 45%
SSBR-2: SSBR4430, TSRC, styrene 38%
SSBR-3: S-1322, Dynasol, styrene 30%
SSBR-4: Duradene 763B, Firestone, styrene 40.5%, Oil 27.3 phr extended
SSBR-5: Tufdene 1000, Asahi Kasei, styrene 18%, ML$_{1+4}$ (100° C.) 45
SSBR-6: SL552, JSR, styrene 23.5%, ML$_{1+4}$ (100) 55
SSBR-7: Tufdene 2000R, Asahi Kasei, styrene 25%, ML$_{1+4}$ (100° C.) 45
SBS-1: T-439, Asahi Kasei, styrene 45%, hardness 83
SBS-2: KTR201, Kumho, styrene 31.5%, hardness 77
SBS-3: Globalprene 3522, LCY, styrene 23%, MI(190, 5 kg) 20 g/10 min
SBS-4: Globalprene 3527, LCY, styrene 25%, MI(190, 5 kg) 8 g/10 min
IR-307: Kraton, polyisoprene
BR-01: Kumho, polybutadiene rubber
RB820: JSR, syndiotactic 1,2-polybutadiene
Vestenamer 8120: Polyoctenamer, Evonik
Peroxide-1: Bis(t-butylperoxy isopropyl)benzene
Silica-1: Aerosil 200, Evonik
Silane A-171: Vinyl trimethoxysilane, Momentive
EGDMA: Ethylene glycol dimethacrylate The polymers and the additives were mixed in the amounts shown in Tables 1 to 3 in a kneader preheated to 80° C. for 10 min. Each of the mixture was transferred to an open mill where a 5 mm thick sheet was produced. The sheet was cooled at room temperature for 3 h. Thereafter, a mold was placed on a hot plate of a compression molding machine set at 165° C. and preheated. The sheet was put into a cavity of the mold, crosslinked for 5 min, and demolded to obtain a specimen having dimensions of 20 cm×20 cm×2 mm. The specimen was tested for the following physical properties.

The physical properties of the transparent shoe soles of Comparative Examples 1-14 and Examples 1-8 are shown in Tables 1 to 3.

The numbers given in the tables are parts by weight.

TABLE 1

|  | Comparative Example 1 | Comparative Example 2 | Comparative Example 3 | Comparative Example 4 | Comparative Example 5 | Comparative Example 6 | Example 1 | Example 2 |
|---|---|---|---|---|---|---|---|---|
| SSBR-1 | 20 |  |  | 100 |  |  | 50 |  |
| SSBR-2 |  |  |  |  |  |  |  | 50 |
| SSBR-3 |  |  |  |  |  |  |  |  |
| SSBR-4 |  |  |  |  |  |  |  |  |
| SBS-1 |  |  |  |  | 100 |  | 50 | 50 |
| SBS-2 |  |  |  |  |  | 50 |  |  |
| IR-307 | 10 | 50 | 50 |  |  |  |  |  |
| BR-01 | 70 |  |  |  |  |  |  |  |
| RB820 |  | 50 | 50 |  |  |  |  |  |
| Vestenamer8120 |  |  | 2 |  |  |  |  |  |
| Peroxide-1 | 0.7 | 0.7 | 0.7 | 0.7 | 0.7 | 0.7 | 0.7 | 0.7 |
| Silane-1 | 1.0 |  |  | 1.0 | 1.0 | 1.0 | 1.0 | 1.0 |
| Silica-1 | 25 |  |  |  |  |  |  |  |
| EGDMA |  | 4 | 4 |  |  |  |  |  |
| Total styrene, % |  |  |  | 45 | 45 | 38.3 | 45 | 41.5 |
| Hardness, Shore A | 60 | 60 | 62 | 58 | (83) | (80) | 68 | 65 |
| Tensile strength, kg/cm$^2$ | 130 | 110 | 107 | 75 | 90 | 82 | 85 | 77 |
| DIN abrasion, mm$^3$ | 80 | (250) | 100 | (160) | 100 | 140 | 125 | 145 |
| Haze, % | 7 | 5 | (11) | 4 | 4 | 6 | 7 | 7 |
| TT, % | 91 | 92 | (87) | 91 | 91 | 91 | 91 | 91 |
| Yellowing (80° C., 90% RH, 7 days) | (5) | 2 | 2 | 1 | 1 | 1 | 1 | 1 |
| Yellowing (35° C., 90% RH, 30 days) | (5) | 1 | 1 | 1 | 1 | 1 | 1 | 1 |
| Possible to use for | Impossible | Impossible | Impossible | Impossible | Impossible | Impossible | Possible | Possible |

TABLE 1-continued

|  | Comparative Example 1 | Comparative Example 2 | Comparative Example 3 | Comparative Example 4 | Comparative Example 5 | Comparative Example 6 | Example 1 | Example 2 |
|---|---|---|---|---|---|---|---|---|
| transparent shoe sole? |  |  |  |  |  |  |  |  |

TABLE 2

|  | Example 3 | Example 4 | Comparative Example 7 | Comparative Example 8 | Example 5 | Example 6 | Comparative Example 9 | Reference Example 1 |
|---|---|---|---|---|---|---|---|---|
| SSBR-1 |  |  |  |  |  | 50 |  | 50 |
| SSBR-2 |  |  |  |  | 50 |  | 50 |  |
| SSBR-3 | 35 | 65 | 75 |  |  |  |  |  |
| SSBR-4 |  |  |  | 60 |  |  |  |  |
| SBS-1 | 65 | 35 | 25 | 40 | 50 | 50 | 50 | 50 |
| SBS-2 |  |  |  |  |  |  |  |  |
| IR-307 |  |  |  |  |  |  |  |  |
| BR-01 |  |  |  |  |  |  |  |  |
| RB820 |  |  |  |  |  |  |  |  |
| Vestenamer8120 |  |  |  |  |  |  |  |  |
| Peroxide-1 | 0.7 | 0.7 | 0.7 | 0.7 | 0.7 | 0.7 | 0.7 | 0.7 |
| Silane-1 | 1.0 | 1.0 | 1.0 | 1.0 | 1.0 | 1.0 | 1.0 | 1.0 |
| Silica-1 |  |  |  | 4 | 4 |  | 6 |  |
| EGDMA |  |  |  |  |  |  |  |  |
| Total styrene, % | 39.1 | 35.3 | (33.8) | 42.3 | 41.5 | 41.5 | 41.5 | 41.5 |
| Hardness, Shore A | 69 | 58 | (54) | 60 | 67 | 67 | 67 | 64 |
| Tensile strength, kg/cm$^2$ | 110 | 77 | (65) | 75 | 80 | 77 | 83 | (65) |
| DIN abrasion, mm$^3$ | 130 | 140 | (160) | (160) | 135 | 145 | 130 | (160) |
| Haze, % | 9 | 8 | 6 | (30) | 9 | 9 | (15) | 7 |
| TT, % | 90 | 91 | 91 | (77) | 90 | 90 | (85) | 91 |
| Yellowing (80° C., 90% RH, 7 days) |  |  |  | (3) | 2 | 2 | (3) | 1 |
| Yellowing (35° C., 90% RH, 30 days) | 1 | 1 | 1 | 2 | 2 | 2 |  | 1 |
| Possible to use for transparent shoe sole? | Possible | Possible | Impossible | Impossible | Possible | Possible | Impossible | Impossible |

50

TABLE 3

|  | Comparative Example 10 | Comparative Example 11 | Example 7 | Comparative Example 12 | Comparative Example 13 | Example 8 | Comparative Example 14 |
|---|---|---|---|---|---|---|---|
| SSBR-1 |  |  |  |  | 50 | 50 | 60 |
| SSBR-5 | 50 |  |  |  |  |  |  |
| SSBR-6 |  | 50 |  | 40 |  |  |  |
| SSBR-7 |  |  | 50 |  |  |  |  |
| SBS-1 | 50 | 50 | 50 | 60 |  |  |  |
| SBS-3 |  |  |  |  | 50 |  | 40 |
| SBS-4 |  |  |  |  |  | 50 |  |
| Peroxide-1 | 0.7 | 0.7 | 0.7 | 0.7 | 0.7 | 0.7 | 0.7 |

TABLE 3-continued

| | Comparative Example 10 | Comparative Example 11 | Example 7 | Comparative Example 12 | Comparative Example 13 | Example 8 | Comparative Example 14 |
|---|---|---|---|---|---|---|---|
| Silane-1 | 1.0 | 1.0 | 1.0 | 1.0 | 1.0 | 1.0 | 1.0 |
| Total styrene, % | (31.5) | (34.25) | 35 | 36.4 | (34) | 35 | 36.2 |
| Hardness, Shore A | (54) | 58 | 61 | 62 | (54) | 56 | 55 |
| Tensile strength, kg/cm$^2$ | (68) | 77 | 80 | 92 | (67) | 72 | 78 |
| DIN abrasion, mm$^3$ | (180) | 150 | 130 | 125 | (170) | 145 | 135 |
| Haze, % | (13) | (12) | 9 | (11) | (12) | 9 | (11) |
| TT, % | (86) | (87) | 90 | (87) | (87) | 90 | (88) |
| Yellowing (80° C., 90% RH, 7 days) | 1 | 1 | 1 | 1 | 1 | 1 | 1 |
| Yellowing (35° C., 90% RH, 30 days) | 1 | 1 | 1 | 1 | 1 | 1 | 1 |
| Possible to use for transparent shoe sole? | Impossible | Impossible | Possible | Impossible | Impossible | Possible | Impossible |

*The numbers in the parenthesis indicate unsuitable physical property values.

Test Methods for the Physical Properties and Criteria for Suitability Determination 1) The hardness of each specimen was measured in accordance with ASTM D2240. The specimen was judged to be suitable for a shoe sole when its Shore A hardness was from 55 to 70.

2) The tensile strength of each specimen was measured in accordance with ASTM D412. The specimen was judged to be suitable when its tensile strength was >70 kg/cm$^2$.

3) The DIN abrasion of each specimen was measured in accordance with DIN 53516. The specimen was judged to be suitable for a high performance shoe when its DIN abrasion value was <80, for a medium performance shoe when its DIN abrasion value was 80-120, for a general shoe when its DIN abrasion value was 120-150, and unsuitable for a shoe sole when its DIN abrasion value exceeded 150.

4) For haze (%) and total transmittance (TT, %) measurements, 2.5 mm thick specimens were produced in the same manner as described above. The haze and total transmittance of each specimen were measured using a haze meter NDH 2000 (Nippon Denshoku) in accordance with the procedure specified in ASTM D1003. The specimen was judged to be suitable when its haze was <10% and unsuitable when its haze was >10%. The specimen was judged to be suitable when its total transmittance was >90% and unsuitable when its total transmittance <90%.

5) Yellowing test (GB/T 20991 Section 6.10): Each specimen was tested for yellowing stability. For high-temperature yellowing stability, the specimen was stored in a hydrolysis test oven at 80° C. and 90% RH for 7 days. For room-temperature yellowing stability, the specimen was stored in a hydrolysis test oven at 35° C. and 90% RH for 30 days. The specimen was withdrawn from the oven. A change in the color of the specimen was observed with the naked eye and the yellowing stability was evaluated using a 5-point scale. Point 1 indicates the best yellowing stability and point 5 indicates the most severe color change.

As can be seen from the results in Tables 1 to 3, the specimens of Examples 1 and 2 showed superior high-temperature yellowing stability and room-temperature yellowing stability and were excellent in transparency and wear resistance while maintaining their tensile strength and hardness compared to the specimens of Comparative Examples 1-10. The comparative specimens were produced in the same manner as in Examples 1-2, except that the total styrene content of the elastic polymer was less than 35 wt % (Comparative Examples 1-3), SBR was used alone (Comparative Example 4), SBS was used alone (Comparative Example 5), two different kinds of SBS polymers were used (Comparative Example 6), the total styrene content of the elastic polymer was less than 35 wt % (Comparative Example 7), the oil extended SBR was used (Comparative Example 8), and excess silica was used (Comparative Example 9).

These results concluded that the use of a controlled amount of the crosslinking agent, a controlled amount of the silane coupling agent and a controlled amount of the styrene leads to improved transparency and wear resistance of the transparent rubber composition without deteriorating the physical properties of the rubber composition and offers room-temperature yellowing stability and high-temperature yellowing stability to the rubber composition.

The invention claimed is:

1. A rubber composition for a shoe sole comprising:
   an elastic polymer comprising a styrene butadiene rubber (SBR) and a styrene butadiene styrene (SBS) thermoplastic rubber; and
   a crosslinking agent,
   wherein the total styrene content of the elastic polymer is at least 35% by weight,
   the styrene butadiene styrene (SBS) thermoplastic rubber is a styrene butadiene styrene block copolymer having a structure in which two polystyrene blocks are separated by a saturated polybutadiene block comprising less than 20% residual ethylenic unsaturation and having a styrene content of at least 30% by weight, and
   the styrene butadiene styrene block copolymer comprises polystyrene end blocks having a number average molecular weight of 5,000 to 35,000 and a saturated polybutadiene midblock having a number average molecular weight of 20,000 to 170,000 and having from 35% to 55% 1,2-configuration.

2. The rubber composition according to claim 1, wherein the styrene butadiene rubber (SBR) is prepared by solution polymerization of butadiene and styrene.

3. The rubber composition according to claim 2, wherein the solution polymerized styrene butadiene rubber (SBR) is prepared by polymerization of 20 to 75% by weight of butadiene and 25 to 80% by weight of styrene.

4. The rubber composition according to claim 1, wherein the styrene butadiene styrene (SBS) thermoplastic rubber is prepared by polymerization of 50 to 75% by weight of butadiene and 25 to 50% by weight of styrene.

5. The rubber composition according to claim 2, wherein the solution polymerized styrene butadiene rubber (SBR) has a styrene content of at least 25% by weight, the styrene butadiene styrene (SBS) thermoplastic rubber has a styrene content of at least 25% by weight.

6. The rubber composition according to claim 1, wherein the styrene butadiene rubber and the styrene butadiene styrene thermoplastic rubber are non-oil extended rubbers.

7. The rubber composition according to claim 1, wherein the solution polymerized styrene butadiene rubber (SBR) is present in an amount of 30 to 70% by weight and the styrene butadiene styrene (SBS) thermoplastic rubber is present in an amount of 70 to 30% by weight, based on 100% by weight of the elastic polymer.

8. The rubber composition according to claim 1, wherein the crosslinking agent is present in an amount of 0.01 to 3 parts by weight, based on 100 parts by weight of the elastic polymer.

9. The rubber composition according to claim 1, further comprising silane coupling agents.

10. The rubber composition according to claim 1, wherein the rubber composition is used as a shoe sole, and the shoe sole is a transparent shoe sole.

11. A molded article comprising the rubber composition according to claim 1.

12. A molded article having a haze of 10% or less and a total transmittance (TT) of 90% or more, as measured in accordance with ASTM D1003 for a specimen produced by crosslinking the rubber composition according to claim 1.

13. A molded article having a DIN abrasion of 150 mm$^3$ or less, as measured in accordance with DIN 53516 for a specimen produced by crosslinking the rubber composition according to claim 1.

14. The rubber composition according to claim 1, further comprising 5 parts by weight or less of silica, based on 100 parts by weight of the elastic polymer.

* * * * *